(12) United States Patent
Ross et al.

(10) Patent No.: US 9,081,568 B1
(45) Date of Patent: Jul. 14, 2015

(54) ELECTRICAL POWER SYSTEM WITH AUTOMATIC TRANSFER SWITCH FAILURE PROTECTION

(71) Applicants: Peter G. Ross, Olympia, WA (US); Richard Arvel Stevens, Auburn, WA (US)

(72) Inventors: Peter G. Ross, Olympia, WA (US); Richard Arvel Stevens, Auburn, WA (US)

(73) Assignee: Amazon Technologies, Inc., Reno, NV (US)

( * ) Notice: Subject to any disclaimer, the term of this patent is extended or adjusted under 35 U.S.C. 154(b) by 357 days.

(21) Appl. No.: 13/626,723

(22) Filed: Sep. 25, 2012

(51) Int. Cl.
*G06F 1/00* (2006.01)
*G06F 11/30* (2006.01)
*H02J 9/00* (2006.01)
*G06F 1/32* (2006.01)
*H02J 9/06* (2006.01)

(52) U.S. Cl.
CPC .............. *G06F 1/3203* (2013.01); *H02J 9/062* (2013.01)

(58) Field of Classification Search
CPC ................................................... G06F 1/3203
USPC ........................................................ 713/300
See application file for complete search history.

(56) References Cited

U.S. PATENT DOCUMENTS

| | | | |
|---|---|---|---|
| 4,044,268 A * | 8/1977 | Hammel et al. ................ 307/66 |
| 4,060,735 A | 11/1977 | Pascucci et al. |
| 5,281,859 A * | 1/1994 | Crane ........................... 307/139 |
| 5,498,915 A * | 3/1996 | Crane ........................... 307/139 |
| 5,675,194 A | 10/1997 | Domigan |
| 5,939,799 A * | 8/1999 | Weinstein ........................ 307/64 |
| 6,008,971 A | 12/1999 | Duba et al. |
| 6,593,670 B2 | 7/2003 | Anderson |
| 6,768,225 B2 * | 7/2004 | Chang et al. ..................... 307/65 |
| 6,876,103 B2 * | 4/2005 | Radusewicz et al. ........... 307/64 |
| 6,944,002 B2 * | 9/2005 | Serrano et al. .................. 361/62 |
| 6,992,247 B2 | 1/2006 | Rasmussen et al. |
| 7,560,831 B2 | 7/2009 | Whitted et al. |
| 8,004,115 B2 | 8/2011 | Chapel et al. |
| 8,500,465 B1 * | 8/2013 | Ross et al. ....................... 439/79 |
| 8,686,594 B2 * | 4/2014 | Morales et al. ................. 307/64 |
| 8,707,095 B2 * | 4/2014 | Grimshaw ...................... 714/14 |
| 2002/0135233 A1 | 9/2002 | Cratty |
| 2003/0117761 A1* | 6/2003 | Pebles et al. ................... 361/111 |
| 2007/0046103 A1 | 3/2007 | Belady et al. |
| 2008/0018175 A1 | 1/2008 | McNamara et al. |

(Continued)

OTHER PUBLICATIONS

U.S. Appl. No. 13/071,488, filed Mar. 24, 2011, Michael P. Czamara.

(Continued)

*Primary Examiner* — Suresh Suryawanshi
(74) *Attorney, Agent, or Firm* — Robert C. Kowert; Meyertons, Hood, Kivlin, Kowert & Goetzel, P.C.

(57) ABSTRACT

A data center includes electrical loads and an electrical power distribution system. The electrical power system includes a primary power source, one or more secondary power sources, and one or more groups of automatic transfer switches. Each automatic transfer switch and its corresponding load define a branch of the group. Each of the groups of automatic transfer switches includes a power cross-coupling system that cross-couple the branches in the group such that a load coupled to the output of the automatic transfer switch in one branch in the group is coupled to the output of an automatic transfer switches in the other branches of the group.

29 Claims, 9 Drawing Sheets

(56) References Cited

U.S. PATENT DOCUMENTS

2009/0314541 A1    12/2009    Jones et al.
2010/0235671 A9    9/2010    Jain
2011/0068625 A1    3/2011    Duan et al.

OTHER PUBLICATIONS

U.S. Appl. No. 12/892,750, filed Sep. 28, 2010, Osvaldo P. Morales.
International Search Report and Written Opinion for PCT/US11/51273, dated Jan. 26, 2012, Amazon Technologies, Inc., 11 pages.

* cited by examiner

ELECTRICAL POWER SYSTEM WITH AUTOMATIC TRANSFER SWITCH FAILURE PROTECTION

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 208 V). A network of cabling, bus bars, power connectors, and power distribution units, is used to deliver the power at the lower voltage to numerous specific components in the facility.

Some data centers include back-up components and systems to provide back-up power to servers in the event of a failure of components or systems in a primary power system. In some data centers, each primary power system may have its own back-up system that is fully redundant at all levels of the power system. For example, in a data center having multiple server rooms, each server room may have its own primary power system and back-up power system.

In some systems, an automatic transfer switch provides switching between alternate power systems. For example, an automatic transfer switch may switch power between a primary power system and a back-up power system. If the automatic transfer switch coupled to a rack system fails (for example, due to an overcurrent condition in the automatic transfer switch), the system may no longer be able to automatically switch to back-up power during a primary system failure.

In some cases, an automatic transfer switch that has properly functioned to switch to back-up power nevertheless fails to switch back to the primary power system once primary power has been restored. In this case, a power mismatch between primary power and secondary power downstream from the automatic transfer switch may cause a failure in the power system. In addition, having an automatic transfer switch stuck on back-up power even after primary power is restored may place strain on the back-up power system (keep the back-up system on a higher duty cycle that it is designed for).

Figure 1:
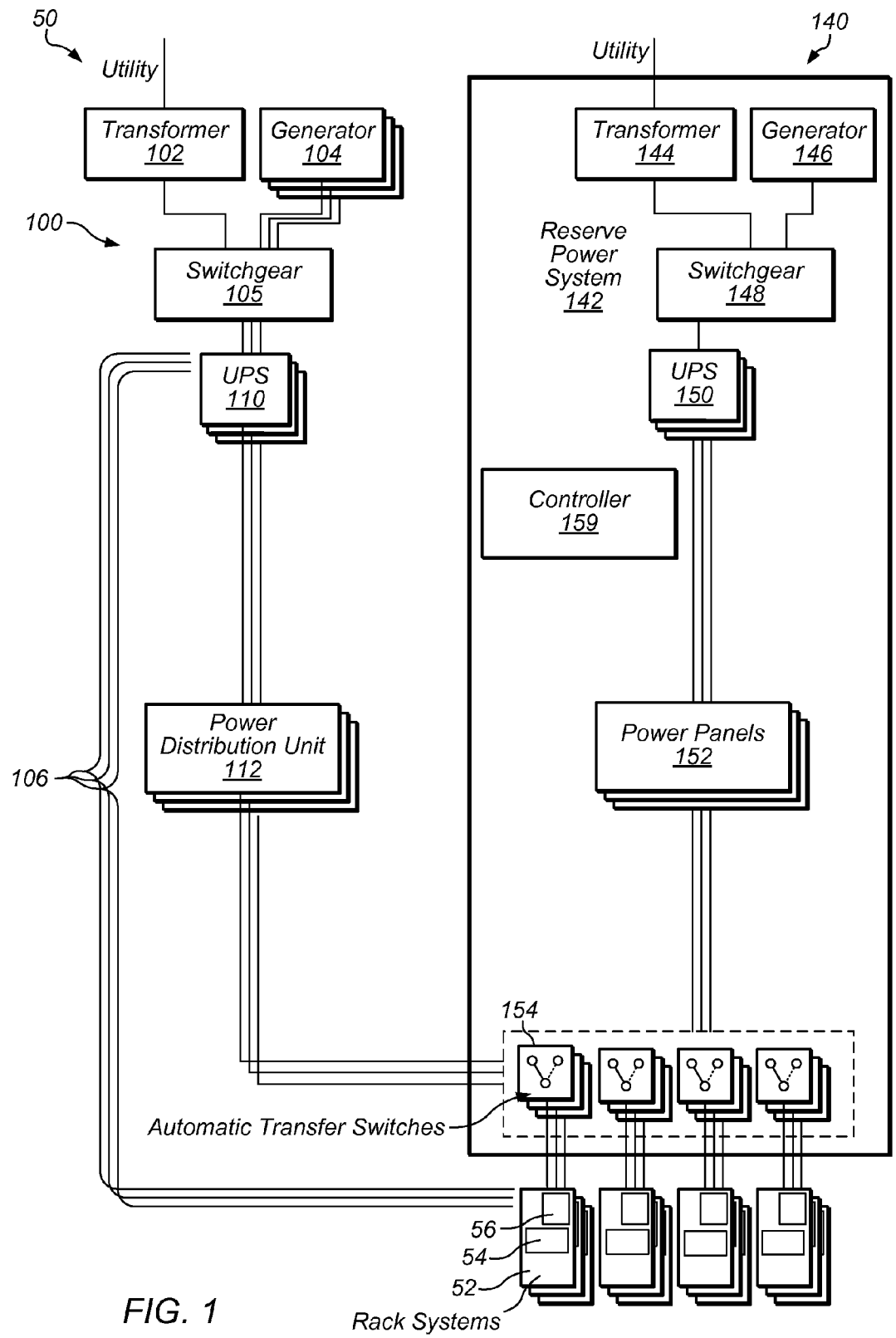
FIG. 1 is a block diagram illustrating one embodiment of a data center having a reserve power system that backs up primary power systems for multiple rooms of a data center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for supplying power to electrical systems are disclosed. According to one embodiment, a data center includes a plurality of loads and an electrical power distribution system. The electrical power system includes a primary power source, one or more secondary power sources, and one or more groups of automatic transfer switches. Each automatic transfer switch and its corresponding load define a branch of the group. Each of the groups of automatic transfer switches includes a power cross-coupling system that cross-couple the branches in the group such that a load coupled to the output of the automatic transfer switch in one branch in the group is coupled to the output of an automatic transfer switches in the other branches of the group.

According to one embodiment, a system includes a plurality of loads and an electrical power distribution system. The electrical power system includes a primary power source, one or more secondary power sources, and one or more automatic transfer switches. Each automatic transfer switch and its corresponding load define a branch of the system. Each branch may include a power junction device that couples the branch with a back-up power source such that a load coupled to the output of the automatic transfer switch in the branch is coupled to the back-up power source.

According to one embodiment, a power junction device includes a main junction power input that can couple with a power source, a junction power output that can couple with a load, a set of conductors that can couple the main junction power input to the junction power output, and one or more sets of power cross coupling terminals. The sets of power cross-coupling terminals can couple the load to a back-up power source.

According to one embodiment, a method includes coupling each of a plurality of loads to an automatic transfer switch of a power distribution system. Each of the automatic transfer switches can switch between a primary power source and a secondary power source. Branches of the power distribution system are cross-coupled to form a group of automatic transfer switches such that a load coupled to the output of the automatic transfer switch in one of the branches is coupled to the output of an automatic transfer switch in other branches of the group. Electrical power is supplied through the automatic transfer switches to the loads.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc—read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, one component in a power distribution system is "downstream" from another component in the power distribution system if the one component receives power from the other component or is at a lower level in the power distribution system than the other component. For example, a floor PDU may be downstream from a UPS, or a power supply unit in a server may be downstream from a rack PDU.

As used herein "floor-level", as applied to a component or system, means the component or system serves two or more racks on the floor of a computer room or other facility.

As used herein, a "module" is a component or a combination of components physically coupled to one another. A module may include functional elements and systems, such as computer systems, circuit boards, racks, blowers, ducts, and power distribution units, as well as structural elements, such a base, frame, housing, or container.

As used herein "PDU-level", as applied to a component or system, means the component or system serves a single PDU, or electrical systems coupled to a single PDU.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "power panel" means any panel, device, module, component, or combination thereof, that can be used to transfer or distribute electrical power from one or more input conductors to one or more output conductors. In certain embodiments, a remote power panel includes main lug only panel conductors. A remote power panel may be housed in an enclosure, such as a cabinet.

As used herein, "primary power" means any power that can be supplied to an electrical load, for example, during normal operating conditions.

As used herein, a "match", in the context of matching sets of power lines, means that the characteristics between the sets of power lines are similar to one another within acceptable limits. A match does not require that the measurements of the two items be precisely equal. In some embodiments, the acceptable variance levels for a match are predetermined. For example, in one embodiment, for a voltage level match, an input power line may be predetermined to match a feed line if the difference in measured voltage between the two lines is 7 volts or less. Various characteristics, such as voltage, waveform, etc. may be used as criteria to determine a match.

As used herein, a "rack" means a rack, container, frame, or other element or combination of elements that can contain or physically support one or more computing devices.

As used herein, a "rack computing system" means a computing system that includes one or more computing devices mounted in a rack.

As used herein "rack-level", as applied to a component or system, means the component or system serves electrical systems in a particular rack. (For example, rack-PDU.

As used herein, "reserve power" means power that can be supplied to an electrical load upon the failure of, or as a substitute for, primary power to the load.

As used herein, a "secondary feed" refers to any feed that supplies power that is separate from a primary power system for at least a portion of a primary power chain. In some embodiments, a secondary power feed may be completely independent of the primary power distribution system. In some embodiments, however, a secondary feed is not completely independent of the primary power distribution system. For example, both the primary power distribution system and a secondary feed may both receive power from the same utility feed, the same step-down transformer (for example, a primary-side transformer), the same uninterruptible power supply (for example, a primary-side), etc.

As used herein, a "switching device" means any device, element, or combination thereof, that can be operated to open or close an electrical switch.

As used herein, one component in a power distribution system is "upstream" from another component in the power distribution system if the one component supplies power to the other component or is at a higher level in the power distribution system than the other component. For example, a UPS may be upstream from a floor PDU, or a rack PDU may be upstream from a power supply unit for a server.

FIG. 1 is a block diagram illustrating one embodiment of a data center having a reserve power system that backs up primary power systems for multiple rooms of a data center. Data center 50 includes rack 52, primary power side 100, and reserve power side 200. Primary power side 100 includes transformer 102, generators 104, and switchgear 105, and primary power systems 106. Sets of computer systems 54 in racks 52 may perform computing operations in data center 50. Computer systems 54 may be, for example, servers in a server room of data center 50. Computer systems 54 in racks 52 may each receive power from one of primary power systems 106. In one embodiment, each of primary power systems 106 corresponds to, and provides power to, the servers in one room in data center 50. In one embodiment, each of primary power systems 106 corresponds to, and provides power to, one rack system in data center 102.

Primary power systems 106 each include UPS 110 and floor power distribution unit 112. Floor power distribution unit 112 provides power to various racks 52. In some embodiments, floor power distribution unit 112 includes a transformer that transforms the voltage from switchgear 105. Each of rack 52 may include a rack power distribution unit 56. Rack power distribution units 56 may distribute power to computer systems 54.

Transformer 102 is coupled to a utility feed. The utility feed may be a medium voltage feed. In certain embodiments, the utility feed is at a voltage of about 13.5 kilovolts or 12.8 kilovolts at a frequency of about 60 Hz. Generators 104 may provide power to primary power systems 106 in the event of a failure of utility power to transformer 102. In one embodiment, one of generators 104 provides back-up power for each of primary power systems 106. UPS 110 may provide uninterrupted power to racks 52 in the event of a power failure upstream from UPS 110.

Reserve power side 140 may provide reserve power for all of the computer systems 54 supplied by primary power systems 106. In some embodiments, reserve power system 142 is powered up at all times during operation of data center 50. Reserve power system 142 may be passive until a failure of one or more components of primary power side 100, at which time reserve power system 142 may become active.

For illustrative purposes, three primary power systems are shown in FIG. 1 (for clarity, details of only the front primary power system 106 are shown). The number of primary power systems 106 on primary power side 100 may vary, however. In certain embodiments, a primary power side may include only one primary power system. In addition, the number of power distribution units, UPSs, switchgear apparatus may vary from embodiment to embodiment (and, within a given embodiment, from system to system). In some embodiments, primary power system 106 includes many floor power distribution units 112. As another example, a primary power system may have one UPS that can supply power to many floor power distribution units.

Reserve power system 142 includes transformer 144 and generator 146. Transformer 144 may supply power to switchgear 148.

Reserve power system 142 also includes transformer 144 and power panels 152. Transformer 144 may and supply power to power panels 152. Power panels 152 may distribute power to servers 54 in racks 52. In one embodiment, each of power panels 152 of reserve power system 142 corresponds to one of floor power distribution units 112 of one of primary power systems 112. For example, if a floor power distribution unit distributes primary power to all of the computer systems in a rack, a remote power panel may distribute reserve power to all of the computer systems in that rack.

Reserve power system 142 also includes an array of automatic transfer switches 154. Automatic transfer switches 154 may control switching of power to computer systems 54 between primary power side 100 and reserve power side 140. automatically switch power from one of primary power systems 106 to reserve power system 142. In some embodiments, one automatic transfer switch is provided for each rack system in a computer room. Thus, an automatic transfer switch may switch input power to the rack between one of floor distribution units 112 and one of remote power panels 152. In another embodiment, an automatic transfer switch provided for each half of a rack system. In still another embodiment, automatic transfer switches may be provided at the server level. In certain embodiments, a reserve power system includes manual transfer switches. Manual transfer switches may be used, for example, to enable maintenance operations to be performed.

Although in the embodiment shown in FIG. 1, power to servers is switched between primary power and reserve power, in some embodiments, a data center may not have automatic transfer switches to switch between primary power and reserve power. In some embodiments, for example, servers in a rack system (such as servers 54 in racks 52) may be dual-supplied by two power systems or include power supplies that accept two or more power source inputs. A server may be sourced from two power feeds without an automatic transfer switch. In some embodiments, a redundant power system for servers in a data center may operate in an active-active failover configuration. In other embodiments, a redundant power system for servers in a data center may operate in an active-passive failover configuration.

Reserve power system 142 further includes controller 159. Controller 159 may serve various control functions in reserve power system 142. In some embodiments, controller 159 may control some or all of automatic transfer switches 154 in reserve power system 142. In certain embodiments, controller 159 includes at least one programmable logic controller. The programmable logic controller may control some or all of the switching in or among devices in reserve power system 142.

In certain embodiments, each automatic transfer switch is internally controlled. The automatic transfer switch may include fault detection circuitry such that when a fault condition is detected in the primary power input, the automatic transfer switch automatically switches to reserve power. Thus, for the computer systems coupled to the switch, in the event of a failure in any of the elements on primary power side 100 upstream from an automatic transfer switch 154, including floor power distribution unit 112, UPS 110, or switchgear 105, the automatic transfer switch may transfer input power from primary power to reserve power. Following such transfer, the computer systems that have been switched to reserve power may receive power from power panels 152 of reserve power system 142. In addition, the computer systems that have been switched to reserve power may be protected against power interruption by UPS 150. In one embodiment, failover from primary power to reserve power is carried out within about 8 to about 20 milliseconds.

In some embodiments, a reserve power system is oversubscribed. As used herein, "oversubscribed" refers to a condition in which total power requirements of the loads coupled to a system exceed the capacity of the system (which includes, for example, exceeding the capacity of a sub-system such as a reserve UPS). For example, a reserve power system may have 5 rack systems coupled to it, but only be able to provide reserve power to one of the rack systems at any given time. In certain embodiments, oversubscription is applied at a facility-wide level.

In various embodiments, a backup power system may include automatic transfer switches at any level in a power chain. In certain embodiments, a reserve power system may include automatic transfer between primary power system and back-up power system multiple levels in a power chain (for example, at a rack level and at a floor level). For example, a reserve power system may include automatic transfer switches at a UPS level and/or automatic transfer switches at a switchgear level of the power distribution chain.

Although the loads in FIG. 1 are described for illustrative purposes as being servers, loads in data center may include various other electrical systems. Electrical systems may include, for example, computing devices, rack-mounted servers, network control devices, power supply units, air moving devices, and mass storage devices. Electrical systems may be supported in racks or external to racks. Electrical systems may perform various functions in a data center, such as data storage or network services. Examples of electrical systems that may be supplied with electrical power may include hospital equipment, utility systems, security systems, military systems, telecommunications systems, or electronic commerce systems. In certain embodiments, a load shedding system protects operation of a critical system, such as a life support system. In some embodiments, the systems are computing devices (for example, servers) in a data center.

In some embodiments, a map is generated for electrical systems (for example, servers) that perform operations in a facility, power components in a power distribution system, or both. The map may be based on signals sent from various components in a data center. For example, in the embodiment shown in FIG. 1, a map can be established that includes sets of electrical systems 52 in racks 54.

In some embodiments, computing assets are mapped to one or more power distribution system components and/or branches. Mapping may be based on IDs assigned to one or more assets, or sets of assets, of a system. In one embodiment, sets of computing devices operating in racks are mapped to circuit breakers that provide overcurrent protection for that set of computing devices. For example, Servers ID0001 through 0010 in Rack 0006 in Data Center 4 may be mapped to Circuit Breaker A021 in Power Panel PP062 in Data Center 4; Servers ID0011 through 0020 in Rack 0007 of Data Center 4 may be mapped to Circuit Breaker A022 in Power Panel PP062 in Data Center 4; etc.

In some embodiments, baseline data for mapping of components one or more a computing facilities are stored in a database. At a later time, the map may be updated based on a new set of messages from components in the computing facilities. Comparisons between the baseline data and current data may be used to assess conditions or components.

Figure 2:
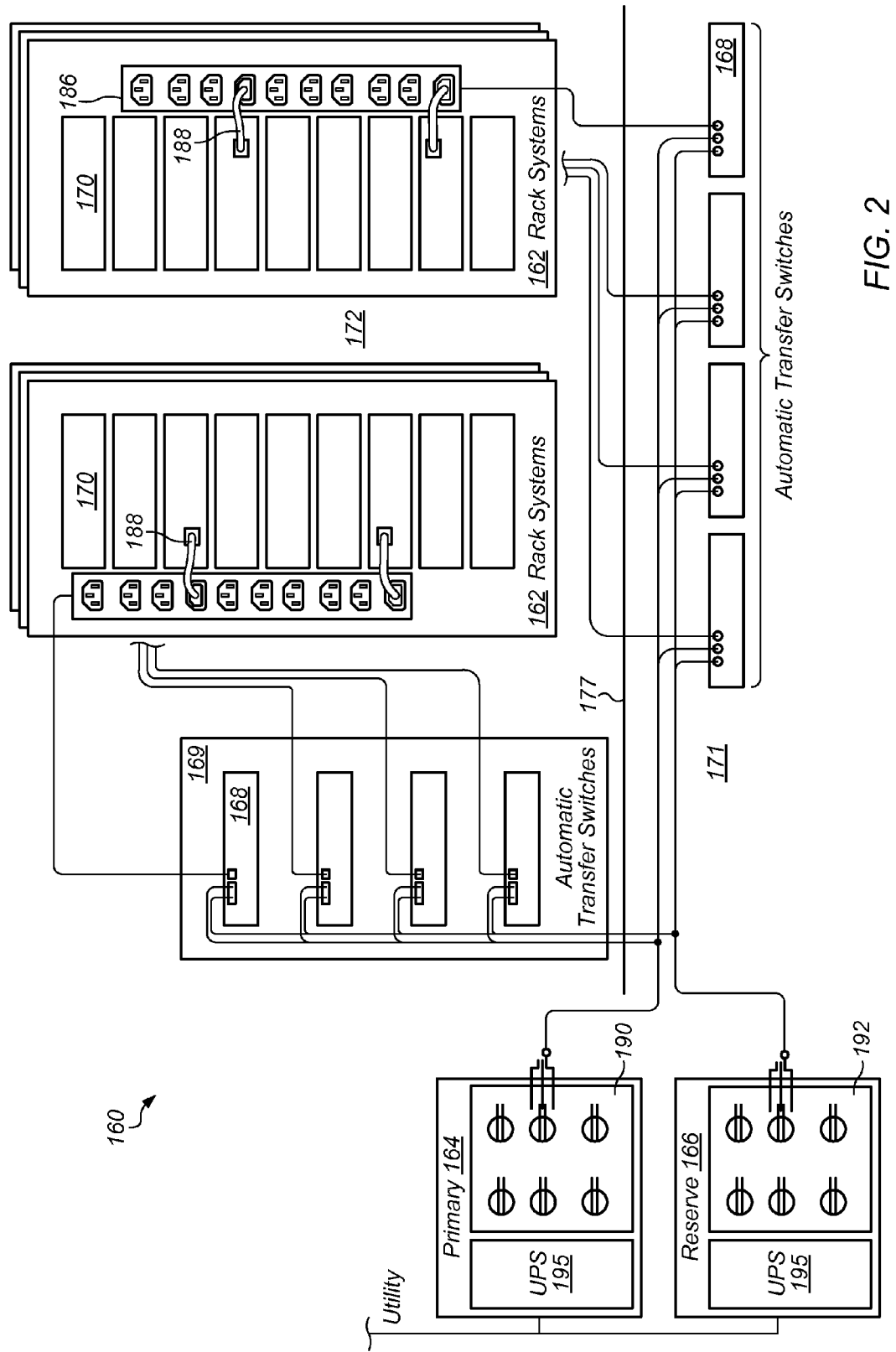
FIG. 2 illustrates an embodiment of a data center including rack systems fed by sets of automatic transfer switches.

FIG. 2 illustrates an embodiment of a data center including rack systems fed by sets of automatic transfer switches. Data center 160 includes rack systems 162, primary power system 164, reserve power system 166, and automatic transfer switches 168. Rack systems 162 include electrical systems 170. Electrical systems may include, for example, computer systems, rack-mounted servers, network control devices, power supply units, air moving devices, and mass storage devices.

Rack systems 162 are located in computing room 172. Electrical systems 170 may receive electrical power from primary power system 164 and reserve power system 166 by way of subfloor feed to the computing room 172. Primary power system 164 and reserve power system 166 are coupled to automatic transfer switches 168 in ATS rack 169 and subfloor location 171. Automatic transfer switches 168 in ATS rack 169 switch between primary and reserve input power and supply the power to electrical systems 210 in the left set of rack systems 162. Automatic transfer switches 168 in subfloor location 171 switch between primary and reserve input power and supply the power to electrical systems 170 in the right set of rack systems 162.

Primary power system 164 and reserve power system 166 may include one or more of various other components and sub-systems, such as transformers, generators, switchgear, and floor power distribution units. Primary power system 164 and reserve power system 166 each include UPS 195. In some embodiments, a primary source receptacle panel and a reserve source receptacle panel are each included in, or receive power from, a floor power distribution unit.

Although only one primary power system 164 and one reserve power systems 166 are shown in FIG. 2, automatic transfer switches may in a data center may receive power from any number of primary and reserve power systems.

The number of primary power systems 164 may vary from embodiment to embodiment. In certain embodiments, the primary power side in a data center includes only one primary power system. In addition, the number of power distribution units, UPSs, switchgear apparatus may vary from embodiment to embodiment (and, within a given embodiment, from system to system). In some embodiments, primary power system 164 includes many floor power distribution units. As another example, a primary power system may have one UPS that can supply power to many floor power distribution units.

Components and sub-systems of primary power system 164 and reserve power system 166 may be provided in any suitable location. In one embodiment, a primary source receptacle panel, a reserve source receptacle panel, and automatic transfer switches 168 are in a sub-floor space below the floor of a computing room of a data center.

In FIG. 2, for the sake of clarity, only two sets of rack systems 162 are illustrated. In various embodiments, however, a system may have any number of rack systems, automatic transfer switches, and other components and systems. In one embodiment, two automatic transfer switches are provided for each rack system. Each of the two automatic transfer switches may control power for half of the servers in a rack system.

In some embodiments, a system includes automatic transfer switches that each supply electrical power to a load. A power junction device in at least one of the branches couple with a back-up power source such that a load coupled to the output of the automatic transfer switch in the branch is also coupled to the back-up power source In some embodiments, two or more branches in a system may be cross-coupled. In a cross-coupled state, all of the loads in the group may receive power from a common back-up source. In some embodiments, the outputs of two or more ATSs are cross-coupled such that each load in the group can receive power from two or more ATSs other the ATS in the branch it is in. In the event of a failure of a predetermined number of the ATSs in the group (for example, one ATS in a group of 4 ATSs), the remaining ATSs have sufficient capacity to supply electrical power for all of the loads in the group.

Figure 3:
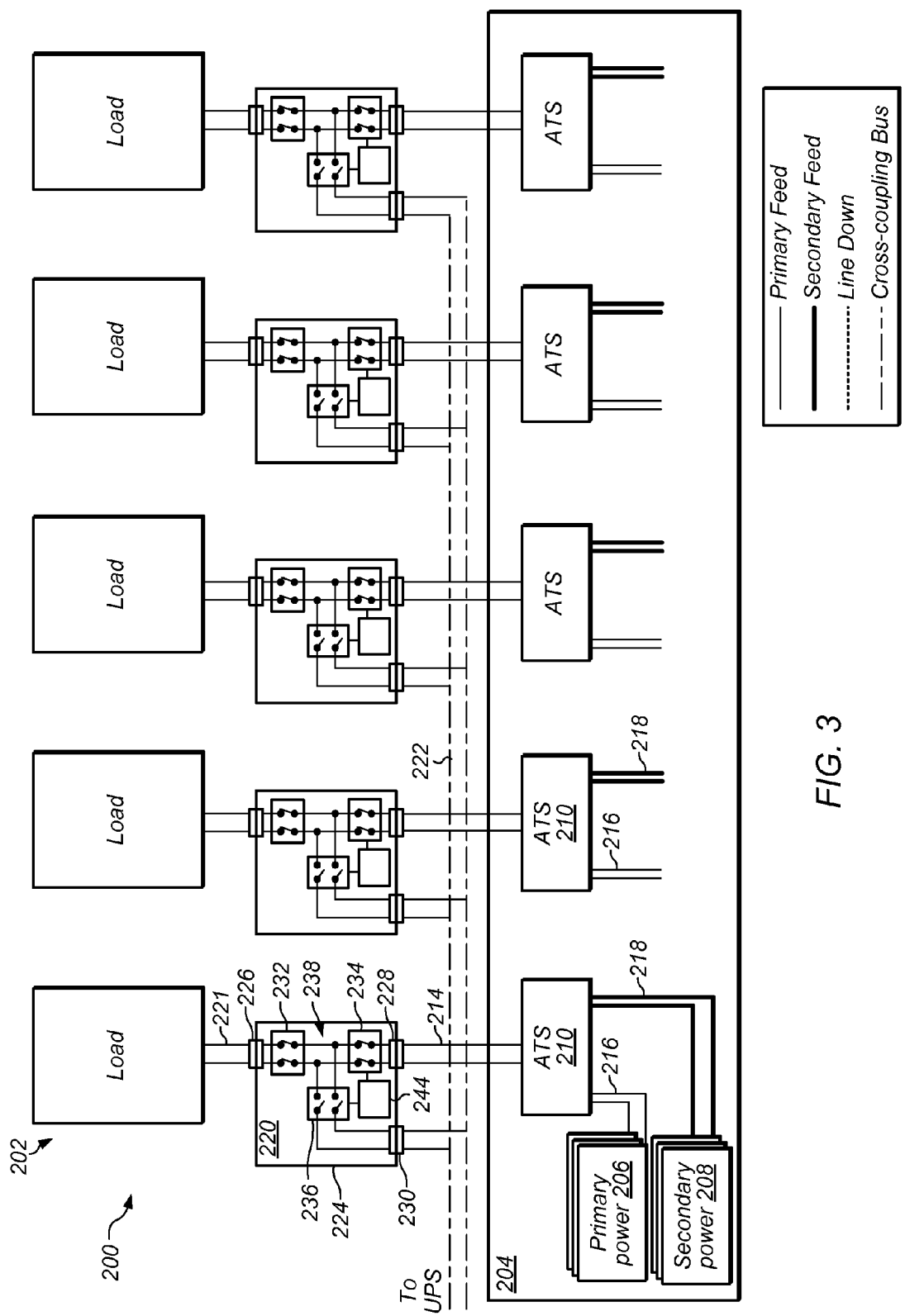
FIG. 3 illustrates one embodiment of a system that includes power junction devices that can be used to cross couple the outputs of automatic transfer switches.

FIG. 3 illustrates one embodiment of a system that includes power junction devices that can be used to cross couple the outputs of automatic transfer switches. System 200 includes loads 202 and power distribution system 204. System 200 may be, in one embodiment, a data center. Loads 202 may each be, for example, a set of computing devices in one or more racks in a data center.

Power distribution system 204 includes primary power system 206, secondary power system 208, and ATSs 210. Each of ATSs 210 may include two inputs and one output. ATSs 210 may switch between one of the two outputs. Each of ATSs 210 is coupled to ATS output lines 214, primary input lines 216, and secondary input lines 218. Each of ATS output lines 214, primary input lines 216, and secondary input lines 218 may each include a pair of conductors. The pair may be, for example, a hot conductor and a neutral conductor, or two conductors of a multi-phase system (for example, a three-phase power system). The pair of conductors may be used to transmit power to the loads.

In some embodiments, the primary input of all of the ATSs are coupled to the same primary power source, and the secondary input of all of the ATSs are coupled the same secondary power source. In some embodiments, however, different ones of ATSs 210 may be coupled to a different secondary power source (for example, to a different UPS). In some embodiments, each of ATSs 210 is supplied with secondary power from its own UPS.

Each of loads 202 is coupled to one of ATSs 210 by way of ATS power output lines 214, power junction device 220, and load lines 221. Each set of ATS 210 and a corresponding power junction device 220 may define a branch of power distribution system 204. Each of loads 202 may receive power from ATS power output lines 214 by way of power junction device 220 and load power lines 221. Power junction device 220 may also couple loads 202 to cross coupling power bus 222.

In some embodiments, cross coupling power bus 222 is connected such that different branches within system 202 are connected with one another. In some embodiments, cross coupling power bus 222 is a back-up power source outside of a group. In certain embodiments, cross coupling power bus 222 is connected to a back-up power source that is separate from primary power 206 and secondary power 208. In this case, an additional level of redundancy may be provided for loads 202.

Power junction device 220 includes enclosure 224. Load connector pair 226, ATS connector pair 228, and cross coupling connector pair 230. A connector receptacle for each of load connector pair 226, ATS connector pair 228, and cross coupling connector pair 230 may be provided on enclosure 224.

In various embodiments, a power junction device may include switching devices. The switching devices may be used to make or break a connection among a load and a power source, among two one or more power sources, or both. For example, in FIG. 3, power junction device 220 includes load switching device 232, power input switching device 234, and bus coupling switching device 236. One side of each of load switching device 232, power input switching device 234, and bus coupling switching device 236 may be commonly coupled to junction 238. The other side of load switching device 232 may be coupled to load lines 221. The other side of power input switching device 234 may be coupled to ATS output power lines 214. The other side of bus coupling switching device may be coupled to cross coupling power bus bar 222.

As noted above, power from ATS 210 may be supplied to one or more of loads 202 by way of one or more power junction devices 220. Thus, in FIG. 3, for example, each of load switching devices 232 and power input switching devices 234 is in a closed state such that power is transmitted through power junction device 220.

In some embodiments, two or more branches within a power distribution system are cross-coupled such that one or more of loads in the system share power from power component in one branch of the system. In various embodiments, cross-coupling in a data center in two or more groups. For example, in the system shown in FIG. 1, each of the three layers of automatic transfer switches 154 may be grouped separately. As another example, in the system shown in FIG. 2, the automatic transfer switches in rack 169 may be grouped separately from the automatic transfer switches in subfloor space 171. In either case, a power junction box (such as power junction box 220 shown in FIG. 3) may be provided between the load and an ATS each branch of the system, and a coupling power bus (such as cross coupling power bus 222 shown in FIG. 3) may be provided between the power junction boxes to enable cross coupling of two or more of the branches of the system.

Figure 4:
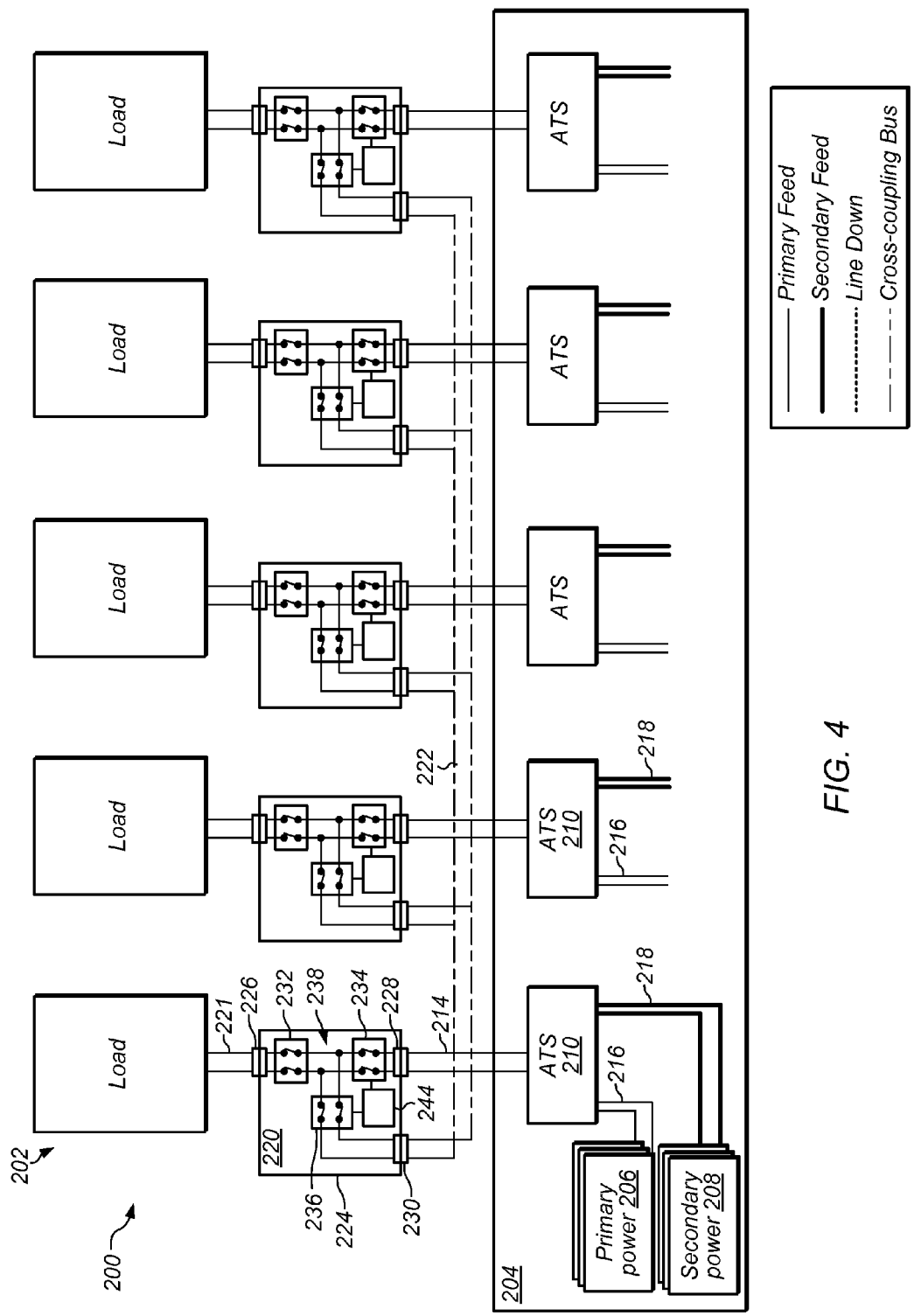
FIG. 4 illustrates one embodiment of a system including multiple automatic transfer switches that are cross-coupled via power junction devices.

FIG. 4 illustrates one embodiment of a system including multiple automatic transfer switches that are cross-coupled via power junction devices. In FIG. 4, each of switching devices 236 is closed such that all of the ATS power outputs are coupled via cross coupling power bus 222. In this state, each of loads 202 can receives power from the corresponding ATS 210 in its branch. Each of loads 202 also can receive power from all the other ATSs 210 included within the group via cross coupling power bus 222. Thus, even if one of ATSs 210 fails to supply power the load in its branch, the load will remain in service by drawings from other ATSs 210 in the group (or, from an external back-up source coupled to cross coupling power bus 222.)

Figure 5:
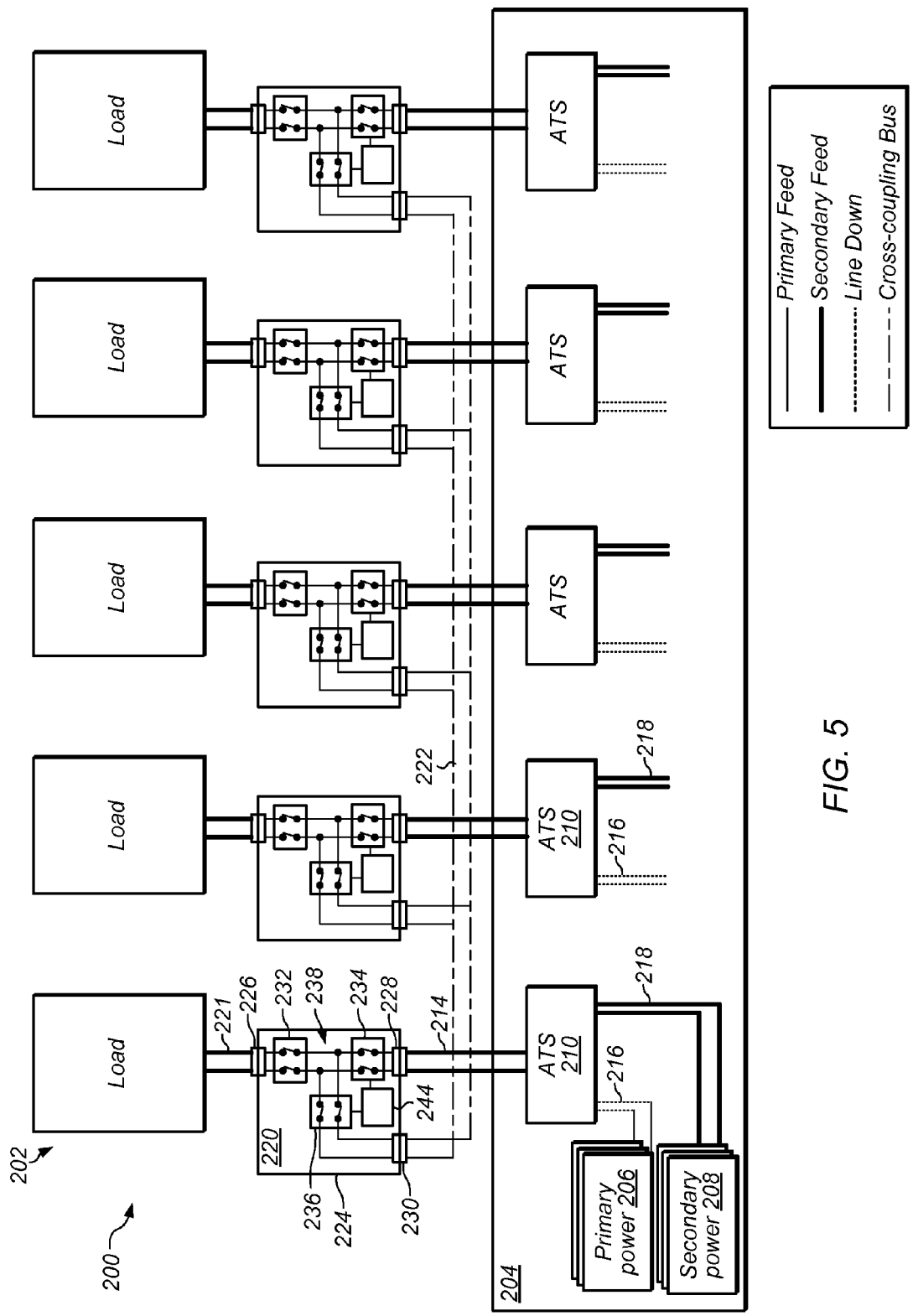
FIG. 5 illustrates one embodiment of a system with cross-coupled automatic transfer switches that are on a secondary feed.

In some embodiments, a system includes a group of automatic transfer switches whose outputs can be cross-coupled while the automatic transfer switches supply power from a secondary feed (for example, reserve power). FIG. 5 illustrates one embodiment of a system with cross-coupled automatic transfer switches that are on a secondary feed. In FIG. 5, primary power input 216 is down for each of ATSs 210. ATSs 210 may operate to switch over to receive power through secondary input lines 218. ATS power outputs 214 are coupled via cross coupling power bus 222 such that each load 202 can draw power from any of ATSs 210.

In some embodiments, a system includes a switching device that can decouple a branch of a power distribution system from other branches of the power distribution system. The switch may be used to isolate one branch of a system from the other branches of the system. In some embodiments, one or more branches are isolated from other branches in response to an overcurrent condition on an ATS in one branch of group.

Figure 6:
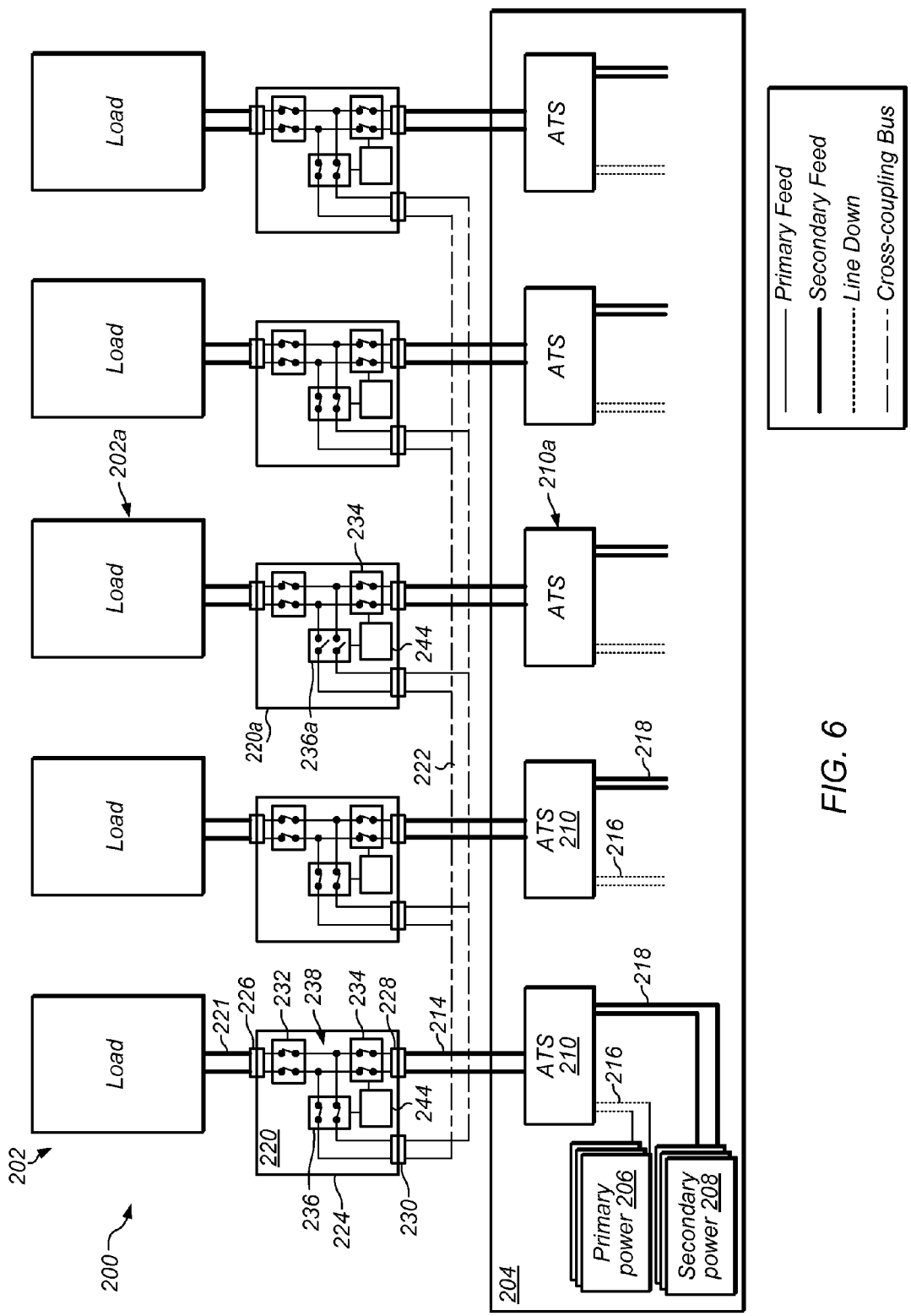
FIG. 6 illustrates one embodiment of a system in which a power junction device decouples a branch of a system from other branches of the system.

FIG. 6 illustrates one embodiment of a system in which a power junction device decouples a branch of a system from other branches of the system. In FIG. 6, switching device 236a in power junction device 220a is in an open state such that the branch including ATS 210a and load 202a is decoupled from cross coupling power bus 222. In this condition, the loads in the other branches of the group cannot cause an overload of ATS 210a. In addition, load 202a cannot contribute to an overcurrent condition of any of ATS 210 in the other branches in the group. In some embodiments, opening of switching device 236a may occur in response to an overcurrent condition in one of ATSs 210. For example, if an overcurrent condition is detected in ATS 210a caused by draw from other branches of system 200, switching device 236a may open so that ATS 210a only supplies power to load 202a.

In some embodiments, a power distribution system includes a switching device for isolating the output of one branch of a power distribution system from the outputs of other power components in a network of power components.

In some embodiments, a power junction device detects a mismatch (for example, a phase mismatch) between power from a main input and power from cross coupled power components.

Figure 7:
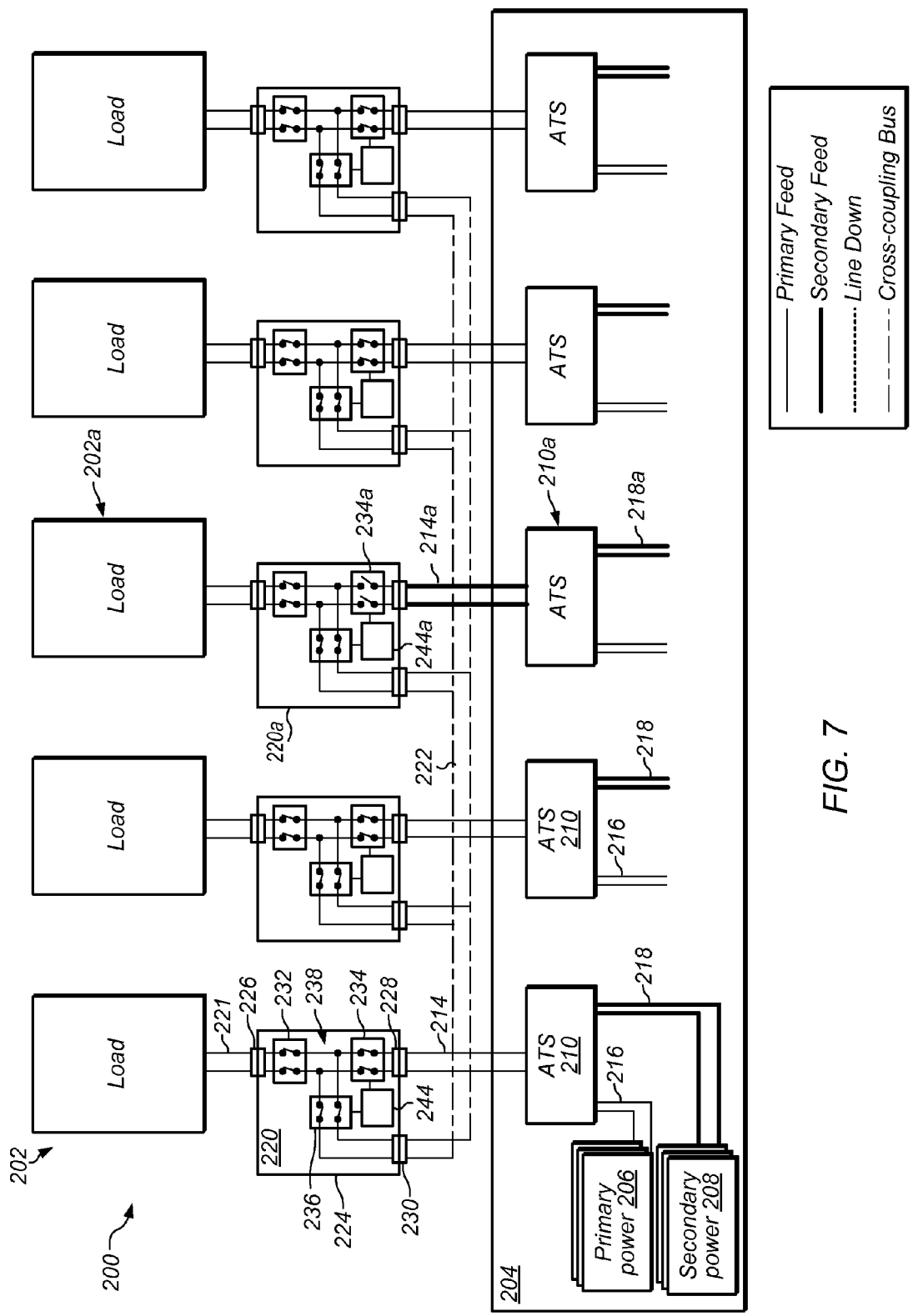
FIG. 7 illustrates one embodiment of an automatic transfer switch that has been isolated from other automatic transfer switches in a group.

FIG. 7 illustrates one embodiment of an ATS stuck on a secondary feed in which the ATS has been isolated from other ATSs in a group. Each of power junction devices 220 includes phase detection device 244. Each of phase detection devices 244 may be operable to detect a mismatch between from cross coupling power bus 222 and power lines 214.

In the situation illustrated in FIG. 7, all of ATS 210 except for ATS 210a have switched back from secondary feed to primary feed (primary power input lines 216). Because ATS 210a failed to switch back, ATS power output lines 214a continue to be coupled to secondary input lines 218a. Phase detection device 244a may detect a mismatch between the secondary feed on ATS power output lines 214a and the primary feed in cross coupling power bus 222. In response to detecting a mismatch, phase detection device 244a may open power input switching device 234a to isolate ATS 210a from power bus 244. Load 202a may remain in service using power drawn from ATSs 210 in other branches of the group via cross coupling power bus 222.

In some embodiments, switching devices in a power junction device include one or more residual current devices. Examples of residual current devices that may be used include residual-current circuit breaker ("RCCB") devices, residual current circuit breaker with overload protection ("RCBO") devices, appliance leakage current interrupter ("ALCI") devices, and ground fault circuit interruption ("GFCI") devices. In certain embodiments, a residual current device is used in combination with (for example, in series with) one or more circuit breakers.

In certain embodiments, a power junction device includes a residual current device that detects a power mismatch between two or more power lines. For example, power junction device 220 may include a residual current device that detects an imbalance between a line on cross coupling power bus 222 and one of ATS power output lines 214a.

In certain embodiments, the residual current device detects an imbalance and opens a switch to decouple the mismatched power lines. In some embodiments, a power junction box includes a combination of overcurrent detection and ground fault detection.

In some embodiments, a circuit protection device in a power junction device detects an imbalance between two or more power lines. In response to the imbalance, the circuit protection device may interrupt power to some or all of the electrical systems coupled to the ATS, decouple two or more sets of power lines, or both.

In various embodiments, some of the circuit protection devices in a power junction device detect an imbalance between power lines supplying power to electrical systems, a magnitude of current in one or more power lines supplying power to electrical systems, or both. Circuit protection devices may include, in some embodiments, active circuits to detect conditions of power lines. The active circuits may be used to implement variable threshold settings. In certain embodiments, an electronic circuit protection device includes one or more op amps.

In some embodiments, a power junction device limits the effect of a single in power distribution system component or load. For example, a power junction device may isolate an ATS having a short on its primary or secondary inputs power sources from its neighbors. As another example, a power junction device may keep a short in a rack from reaching an ATS that has inadequate short circuit protection on its output.

Figure 8:
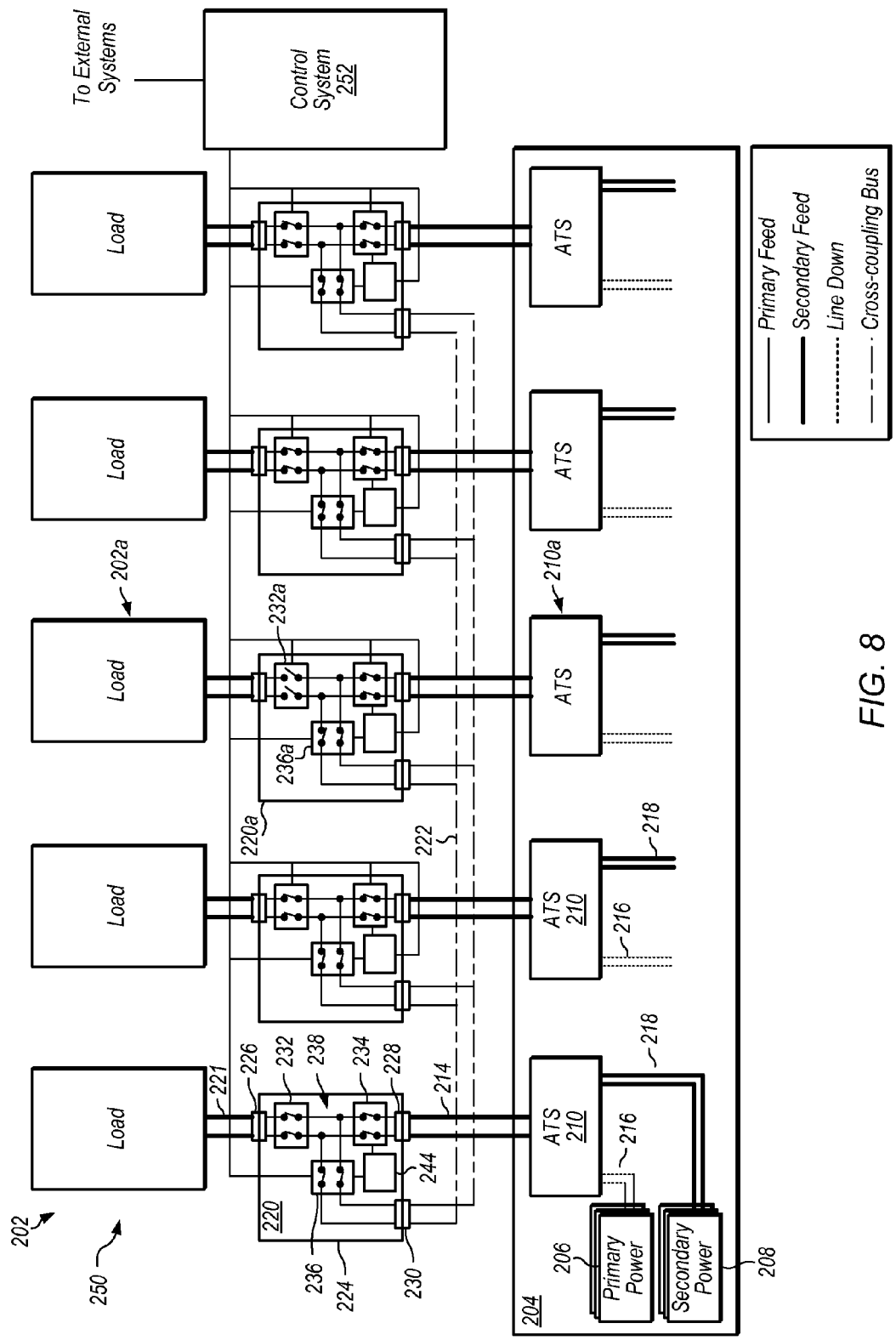
FIG. 8 illustrates one embodiment of a system in which a power junction device has shed a load from a group of cross-coupled automatic transfer switches.

In some embodiments, a power junction device between a power output and a load can shed the load from power supply components in a power distribution system. FIG. 8 illustrates one embodiment of a system in which a power junction device has shed a load from a group of cross-coupled automatic transfer switches. In FIG. 8, switching device 232a has been opened to shed load 202a from the system. Shedding load 202a may reduce a load on ATS 210a, on other ATSs 210 in the group, or both.

In some embodiments, switches in a network are coupled to a power network control system. The control system may be coupled to, or part of a power management system for a data center. Sensors may provide information to the control system about conditions, status, or characteristics in the power network. The control system may control switching devices among power components and loads in the data center. For example, referring to FIG. 8, system 250 includes control system 252. Control system 252 is coupled to load switching device 232, power input switching device 234, and bus coupling switching device 236 in power junction devices 220. In some embodiments, a control system includes a programmable logic controller.

In some embodiments, a control system controls switching with a power network based on measurements of power characteristics acquired in a power distribution system. For example, in the system illustrated in FIG. 8, current sensors may be provided on one or more of loads to sense the current draw from each of loads 202. Control system 252 may be operated to control one or more of load switching device 232, power input switching device 234, and bus coupling switching device 236 in power junction devices 220. In one embodiment, control system 252 operates bus coupling switching device 236 to isolate or connect one or more of the branches of the system from other branches of the system. In another embodiment, control system 252 operates ATS power input switching device 234. In still another embodiment, control system 252 operates load switching devices 232 to isolate a load from a group of ATS outputs.

In some embodiments, connections in a power distribution system of a data center are controlled based on a rack priority. For example, in certain embodiments, lower priority racks may be shed for a network of automatic transfer switches. As another example, a branch including a lower priority rack may remain be isolated from higher priority racks. In some embodiments, loads and power components are mapped to provide information for controlling power to racks based on priority. In some embodiments, a control system (such as control system 252 shown in FIG. 8) stored map data relating to the loads, power components, or both, for use in controlling one or more power distribution systems in a data center.

In some embodiments, information from power junction devices is reported over a network. For example, in the system illustrated in FIG. 8, control system 252 may be used to send information from power junction devices 220 to a power management system via a network connection.

In the system illustrated in FIG. 8, load switching device 232, power input switching device 234, and bus coupling switching device 236 can all be controlled via control system 252. Load switching device 232, power input switching device 234, and bus coupling switching device 236 in each of power junction device may nevertheless in some embodiments be controlled via internal control circuitry in the power junction device. In addition, in some embodiments some or all of load switching device 232, power input switching device 234, and bus coupling switching device 236 are passive devices. For example, in one embodiment, load switching devices 232 are circuit breakers. In certain embodiments, some or all of load switching device 232, power input switching device 234, and bus coupling switching device 236 may be omitted (for example, such that load power lines 221, cross coupling power bus 222, or ATS power output lines 214 are always connected to junction 238.)

In system 250 illustrated in FIG. 8, all of power junction devices 220 are commonly controlled by a single control system (control system 252). Power junction devices may, nevertheless, in some embodiments be controlled by two or more control devices. In some embodiments, control of power junctions between ATSs and loads are distributed among two or more control devices. For example, half of the power junction devices in a group may be controlled by one controller, and the other half of the power junction devices in the group may be controlled by another controller. In certain embodiments, a separate controller is provided for each group of ATSs.

In some embodiments, each power junction device includes its own controller. For example, in the embodiment illustrated in FIG. 8, each of power junction devices 220 may include a controller. Each controller may control switching devices of the power junction device. In one embodiment, a controller in each of power junction devices 220 controls load switching device 232, power input switching device 234, and bus coupling switching device 236.

In some embodiments, power junction devices in a system exchange information among one another, with external systems, or both. In one embodiment, power junction devices in a system are connected with one another over a network. Each power junction device may operate based on information received from one or more other power junction devices. For example, referring to FIG. 8, if a controller in power junction device 220a receives a warning from another one of power junction devices 220 that an overcurrent condition exists, power junction device 220a may isolate ATS 20a and load 202a from the other loads.

In some embodiments, a controller in a power junction device operates based conditions or characteristics of loads, an electrical power distribution system, or both. For example, a controller in power junction device 210a may control load switching device 232 and bus coupling switching device 236 based on information from current sensors in power distribution system 204.

Figure 9:
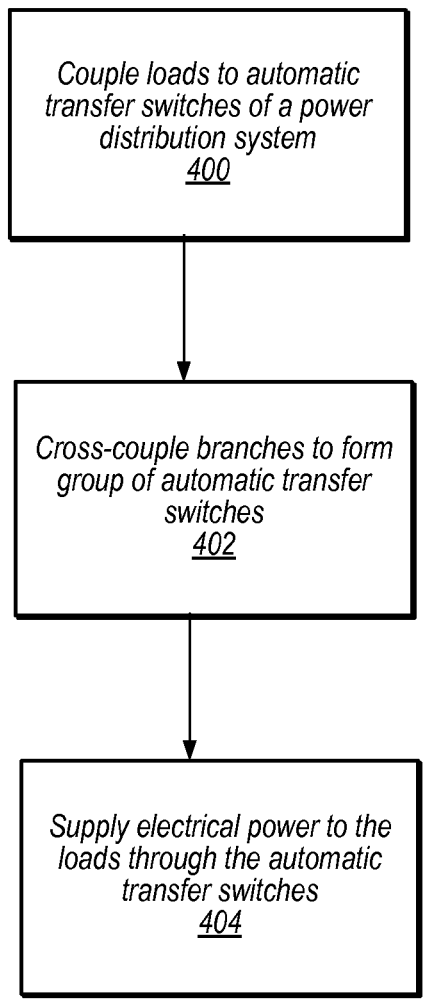
FIG. 9 illustrates a method of supplying power to loads with cross-coupled automatic transfer switches.

FIG. 9 illustrates a method of supplying power to loads with cross-coupled automatic transfer switches. At 400, loads are coupled to automatic transfer switches of a power distribution system. Each pairing of a load with an automatic transfer switch may form a branch of the system.

At 402, branches are cross-coupled to form a group of automatic transfer switches such that a load coupled to the output of the automatic transfer switch in at least one of the branches is coupled to the output of an automatic transfer switch in the other branches of the group.

At 404, electrical power is supplied through the automatic transfer switches to at least one of the loads. A load in one branch may receive power from automatic transfer switches in the other branches of the group. In some embodiments, one branch may be isolated from one or more other branches in response to an overcurrent condition in one of the branches. In some embodiments, an automatic transfer switch whose power characteristics do not match those of the group is isolated from the group. For example, if one automatic transfer switch has failed to switch back to primary to primary power after a restoration, that automatic transfer switch may be isolated from the group.

In some embodiments, the number of automatic transfer switches is chosen to limit the effects (for example, "blast radius") of a failure of a power system component or overcurrent condition. For example, a failure in one group of ATSs that are cross coupled in a data center may not cause a failure in other groups of cross-coupled ATSs in the data center.

Systems with power junction devices for cross coupling power components may in various embodiments include any number of loads, automatic transfer switches, and power junction devices. In some embodiments, each ATS receives power from a separate secondary source. In other embodiments, one or more ATSs receive power from the same source.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
a plurality of loads; and
an electrical power distribution system, comprising:
   a primary power source;
   one or more secondary power sources; and
   one or more groups of automatic transfer switches, wherein each of at least two of the automatic transfer switches comprises a first input coupled to the primary power source, a second input coupled to at least one of the one or more secondary power sources, and an output coupled to a corresponding one of the loads, wherein the automatic transfer switch is configured to switch the output to the load between the first input and second input, wherein each automatic transfer switch and its corresponding load define a branch of the group;
   wherein each of at least one of the one or more groups of the automatic transfer switches comprises a power cross-coupling system configured to cross-couple at least two of the branches in the group such that a load coupled to the output of the automatic transfer switch in at least one branch in the group is coupled to the output of an automatic transfer switch in at least one other branch of the group.

2. The data center of claim 1, wherein at least one of the branches of at least one of the groups comprises a power junction device, wherein the power junction device is configured to couple the load of the branch to the output of an automatic transfer switch in at least one other branch of the group.

3. The data center of claim 1, wherein the power cross-coupling system for at least one of the groups of automatic transfer switches is configured to isolate one branch of the group from at least one other branch of the group in response to an overcurrent condition of the automatic transfer switch in the one branch.

4. The data center of claim 1, wherein the power cross-coupling system for at least one of the groups of automatic transfer switches is configured to:
detect a mismatch between the power output of an automatic transfer switch in one branch of the group and power being supplied from one or more other branches of the group; and isolate, in response to detecting a power output mismatch, the automatic transfer switch from the corresponding load of the branch and from the other branches of the group.

5. The data center of claim 1, wherein the one or more groups of automatic transfer switches comprise two or more groups of at least two automatic transfer switches, wherein each of at least two of the groups comprises a power cross-coupling system configured to cross-couple the outputs of the at least two automatic transfer switches in the group such that a load coupled to the output of one of the automatic transfer switches in the group is coupled to the output of at least one other automatic transfer switch in the group.

6. A system, comprising:
a plurality of loads; and
an electrical power distribution system, comprising:
a primary power source;
one or more secondary power sources; and
two or more automatic transfer switches, wherein each of at least two of the automatic transfer switches comprises a first input coupled to the primary power source, a second input coupled to at least one of the one or more secondary power sources, and an output coupled to a corresponding one of the loads, wherein the automatic transfer switch is configured to switch the output to the load between the first input and second input, wherein each automatic transfer switch and its corresponding load define a branch of the system;
wherein at least one branch of the system comprises a power junction device configured to couple the output of the automatic transfer switch in the branch with a back-up power source from another branch of the system such that a load coupled to the output of the automatic transfer switch in the branch is coupled to the back-up power source.

7. The system of claim 6,
wherein the one or more automatic transfer switches comprise one or more groups of automatic transfer switches, wherein each automatic transfer switch and its corresponding load define a branch of the group,
wherein each of at least one of the one or more groups of the automatic transfer switches comprises a power cross-coupling system configured to cross-couple at least two of the branches in the group such that a load coupled to the output of the automatic transfer switch in at least one branch in the group is coupled to the output of an automatic transfer switch in at least one other branch of the group.

8. The system of claim 6, wherein the power cross-coupling system for at least one of the groups of automatic transfer switches comprises:
a power bus; and
a power junction device in each of two or more branches, wherein each of the one or more power junction devices is coupled to the power bus such that the load of the branch is coupled to an automatic transfer switch in at least one other branch of the group.

9. The system of claim 6, wherein at least one power junction device in at least one branch is configured to isolate one branch of the group from at least one other branch of the group in response to an overcurrent condition of the automatic transfer switch in the one branch.

10. The system of claim 6, wherein at least one power junction device in at least one branch is configured to:
detect a mismatch between the power output of an automatic transfer switch in one branch of the group and power being supplied from the back-up power source; and
isolate, in response to detecting a power output mismatch, the automatic transfer switch from the corresponding load of the branch and from the back-up power source.

11. The system of claim 6, wherein at least one power junction device in at least one branch comprises one or more residual current devices, wherein at least one of the one or more residual current devices is configured to isolate, in response to detecting a power output mismatch, the automatic transfer switch from the corresponding load and from the back-up power source.

12. The system of claim 6, wherein at least one power junction device in at least one branch is configured to shed one or more of the loads in response to an overcurrent condition in the at least one branch.

13. The system of claim 6, wherein at least one of the secondary power sources is oversubscribed.

14. The system of claim 6, further comprising a control system configured to control a connection between at least two branches in the system.

15. The system of claim 14, wherein the control system is configured to control a connection between at least two branches based on one or more characteristics of power in the electrical power distribution system.

16. The system of claim 14, wherein the control system is configured to control a connection between at least two branches based at least in part on a priority of one or more of the loads relative to one or more other loads.

17. The system of claim 6, wherein each of at least two of the branches comprises a power junction device, wherein at least two of the power junction devices comprises a controller configured to control one or more switching devices in the power junction device.

18. The system of claim 17, wherein a controller of at least one of the power junction devices is configured to control switching devices in the power junction device based on information received from one or more other power junction devices in the system.

19. A power junction device, comprising:
a main junction power input configured to couple with a power source;
a junction power output configured to couple with a load;
a set of conductors configured to couple the main junction power input to the junction power output;
one or more sets of power cross coupling terminals, wherein each of at least one of the sets of power cross-coupling terminals is configured to couple the load to a back-up power source;
one or more switching devices configurable to switch such that the main junction power input is isolated from the junction power output; and
one or more other switching devices configurable to switch such that at least one of the one or more sets of cross coupling terminals is isolated from the main junction power input.

20. The power junction device of claim 19, wherein the one or more other switching devices are configurable to isolate at least one of the one or more sets of cross coupling terminals from the main junction power input and the junction power output.

21. The power junction device of claim 19, wherein the one or more switching devices are configurable to isolate the main power input from the junction power output and the one or more sets of cross coupling terminals.

22. The power junction device of claim 21, wherein the one or more switching devices comprise a residual current device, wherein the residual current device is configured to isolate the main power input from the junction power output and the one or more sets of cross coupling terminals in response to a mismatch between at least one of the cross coupling terminals and at least one line of the main power input.

23. The power junction device of claim 19, further comprising:
one or more power sensing devices configured to sense a mismatch in power characteristics between the main power input and at least one set of the cross coupling terminals.

24. A method, comprising:
coupling each of a plurality of loads to an automatic transfer switch of a power distribution system, wherein each of the automatic transfer switches is configured to switch between a primary power source and a secondary power source, wherein each coupling of an automatic transfer switch to a load defines a branch of the power distribution system;
cross-coupling at least two of the branches to form a group of automatic transfer switches such that a load coupled to the output of the automatic transfer switch in at least one of the branches is coupled to the output of an automatic transfer switch in at least one other branch of the group; and
supplying electrical power through the automatic transfer switches to at least one of the loads.

25. The method of claim 24, further comprising isolating one branch of the group from at least one other branch of the group in response to an overcurrent condition of the automatic transfer switch in the one branch.

26. The method of claim 24, further comprising:
detecting a mismatch between the power output of an automatic transfer switch in one branch of the group and power being supplied from one or more other branches of the group; and
isolating, in response to detecting a power output mismatch, the automatic transfer switch from the corresponding load and from the other branches of the group.

27. The method of claim 24, further comprising shedding at least one of the loads in response to an overcurrent condition in at least one of the branches.

28. The method of claim 24, further comprising controlling a connection between at least two of the branches in at least one of the one or more groups of automatic transfer switches based on one or more characteristics of power in the electrical power distribution system.

29. The method of claim 24, further comprising controlling a connection between at least two of the branches in at least one of the one or more groups of automatic transfer switches based at least in part on a priority of one or more racks.

* * * * *